United States Patent [19]

Guill

[11] Patent Number: 5,301,904

[45] Date of Patent: Apr. 12, 1994

[54] CANOPY BREAKING DEVICE

[75] Inventor: Frederick C. Guill, Crownsville, Md.

[73] Assignee: The United States of America as represented by the Secretary of the Navy, Washington, D.C.

[21] Appl. No.: 35,780

[22] Filed: Mar. 17, 1993

[51] Int. Cl.$^5$ .............................................. B64D 25/00
[52] U.S. Cl. ........................... 244/129.1; 244/122 AF; 49/141; 137/68.1; 81/20
[58] Field of Search ............ 244/122 AF, 121, 118.5, 244/129.1; 49/141, 21, 31; 52/1, 98; 89/1.14; 102/272, 274; 137/68.1; 81/20

[56] References Cited

U.S. PATENT DOCUMENTS

| 2,505,456 | 4/1950 | Beecher | 137/68.1 |
| 2,565,731 | 8/1951 | Johnston | 137/68.1 |
| 3,001,536 | 9/1961 | Casey | 137/68.1 |
| 3,542,319 | 11/1970 | Duncan | |
| 3,561,703 | 2/1971 | Stencel | |
| 3,721,407 | 3/1973 | Clarke | 49/141 |
| 3,729,154 | 4/1973 | Deplante | 244/122 AF |
| 3,938,764 | 2/1976 | McIntyre | 244/118.5 |
| 4,049,221 | 9/1977 | Fountain | 137/68.1 |
| 4,275,858 | 6/1981 | Bolton et al. | |
| 4,570,879 | 2/1986 | Dupin | |
| 4,570,880 | 2/1986 | Gehse | |
| 4,580,745 | 4/1986 | Brophy | |
| 5,072,896 | 12/1991 | McIntyre | 244/122 AF |

FOREIGN PATENT DOCUMENTS

| 698226 | 10/1953 | United Kingdom | 49/141 |
| 2253648 | 9/1992 | United Kingdom | 49/141 |

Primary Examiner—Galen L. Barefoot
Attorney, Agent, or Firm—Raymond E. Farrell; Paul I. Kravetz; John H. Stowe

[57] ABSTRACT

An aircraft canopy breaking device, having means for penetrating the canopy glazing material upon application of an applied force from the rising ejection seat to the penetrating means. The device further comprises prepositioning means for prepositioning the penetrating means at a fixed distance from the canopy glazing material, shielding the penetrating means from inadvertently contacting the canopy glazing material, other material or personnel, and compressing whereby upon application of a force the penetrating means contacts the canopy glazing material causing crack propagation in the canopy glazing material.

7 Claims, 2 Drawing Sheets

CANOPY BREAKING DEVICE

BACKGROUND OF THE INVENTION

1. Field of the Invention

The present invention relates to devices for initiating crack propagation in frangible materials. More particularly, the present invention relates to aircraft canopy removing devices. Even more particularly the present invention relates to devices for initiating crack propagation in aircraft canopies.

2. Background Information

Through-the-canopy ejection is commonly employed both as a primary method and as a back-up method of emergency aircrew ejection. As a primary method, through-the-canopy ejection is often selected during design to reduce the total time required for aircrew ejection. This is accomplished by reducing the time required for all subsystems to function, from aircrew recognition of the need to initiate escape until the aircrew are clear of the aircraft. It is also employed as a primary mode to reduce the overall system complexity in order to enhance the overall system reliability by eliminating a serial-step type process which could preclude ejection if any of the serial steps failed. Often through-the-canopy ejection is selected as a back-up to jettisoned-canopy ejection, even at some increased risk of injury or of life support equipment damage, simply to preclude the failure of the canopy jettisoning system from causing the death of the affected aircrew.

Successful through-the-canopy ejection requires that the penetration of the canopy be smooth, i.e., not resulting in any rapid and/or large velocity changes which would induce separation of the ejectee and seat and an increase in the internal pressure of the boost catapult. This combination can result in a rapid seat acceleration upon breaking through the canopy with subsequent injurious levels of "overshoot G" when the seat catches up to the ejectee. Successful through-the-canopy ejection also requires that a seat and its occupant (ejectee) actually break through the cockpit canopy. The seat must not be stalled or delayed so long that the ballistic gas pressure dissipates through leakage around seals and through heat loss through the surface. Such an occurrence could yield fatal results for the ejecting aircrew.

In the past, several proposals for canopy removal have been put forth, however, these proposals all involve complex methods for removing the canopy. One such proposal, disclosed in U.S. Pat. No. 3,542,319 issued to Duncan et al., teaches the use of a catapulting canopy breaker which is attached to telescoping inner and outer tube members. In Duncan, a system using fluid pressure is disclosed to drive the canopy breaker upward so that it impacts and shatters the canopy before the ejecting aircrew member is jettisoned from the aircraft. This method requires using scarce cockpit space to locate the telescoping tubes for the canopy breaker. Moreover, the Duncan canopy breaker is not easily adapted for differing canopy and cockpit configurations.

Other somewhat different approaches involve the use of explosively actuated devices for explosively unlatching the canopy from the aircraft, for explosively operating a movable breaker member which could shatter the canopy, or for directly shattering the canopy. One such approach is represented by U.S. Pat. No. 4,275,858 issued to Bolton et al. In Bolton, fusible conductors are disclosed as being embedded in intimate contact with the canopy material and further connected to a source of electrical power such that a high-energy pulse of current is generated sufficient to fuse the connector and initiate crack propagation in the canopy. These types of proposals, however, necessarily involve the provision of separate explosive charge means and a mechanism for energizing the same. The overall ejection assembly is thereby increased in cost, weight and system complexity, the latter of which markedly affects the degree of maintainability of the system. Moreover, these types of approaches are not readily transferrable from one aircraft configuration to another. This lack of adaptability from one cockpit design to another demands that different systems be employed. Each system would likely have varying service requirements. Maintenance crews would, therefore, need to learn specific requirements for several different configurations. The provision of a more uniform, but less complex canopy breaker system would streamline operations and maintenance for differing canopy and cockpit configurations.

Given a large enough run, for example, 1" to 1-½", and small area incompressible contact points, most ejection seats can smoothly penetrate most canopies. One problem adversely affecting through-the-canopy ejection, however, occurs when, due to logistical or other considerations, an ejection seat's contact areas cannot be designed for a specific canopy curvature configuration to assure minimal area initial contact. That is, the instantaneous initial contact area is too great, thereby reducing the localized stress imposed upon the cockpit canopy to levels below its failure thresholds. Another problem degrading through-the-canopy capability is that of the increased plasticity of canopy glazing materials with elevated temperatures. Such conditions potentially occur under certain climatic conditions or under certain flight conditions which induce strong aerodynamic heating of the canopy glazing material. Under these latter conditions, the canopy glazing material in the area of seat headrest impact typically molds itself around the headbox and other protuberances of the rising seat while the sides of the canopy glazing stretch and deform geometrically. The seat's energy is absorbed and the seat is slowed significantly, even to the extent of stopping over a moderate distance of travel. As noted in the previous paragraph, such slowing of the ejection seat, should it last sufficiently long, can rob most catapults of their energy and result in the system not ejecting the aircrew from the disabled aircraft.

Due to the potential that during parachute deployment, the parachute canopy and/or the parachute suspension lines might contact areas of the headrest, one solution, that of using very sharp ("knife sharp") edge canopy breakers, often is denied the ejection seat system designer. The rational for this is a fear that more ejectees will be endangered by serious parachute damage than might otherwise possibly be placed at risk of non-ejection or of overshoot-G-induced spinal injury if a blunt area canopy breaker were chosen instead. Even were concerns regarding parachute subsystem integrity non-existent, the placement of very sharp ("knife edges") on the top of an ejection seat would entail severe risks to aircraft maintenance personnel which would make their adoption most unlikely. Performance of some cockpit maintenance tasks often requires that maintenance personnel reach over and behind ejection seats in ways requiring their torsos to heavily contact the tops of ejection seats. Sharp objects, especially sharp penetrators, on the headrests could result in many injuries and could degrade aircraft systems maintenance and, thereby, aircraft operational readiness and performance as maintenance personnel attempt to avoid injuries.

SUMMARY OF THE INVENTION

The present invention, a canopy breaking device, is used for initiating crack propagation in frangible materials such as, for example, an aircraft canopy. When used for an aircraft canopy, the device initiates crack propagation immediately prior to aircrew ejection.

In the preferred embodiment to the present invention a lance or other canopy breaking device, is housed within a collapsible enclosure and the enclosure is attached to the inner surface of the canopy glazing material such that an application of an applied force, such as, for example, that from a rising ejection seat, to the lance causes a penetrator to initiate crack propagation in the canopy glazing material. The enclosure positions the penetrator at a fixed distance from the canopy glazing material, shielding the penetrator from inadvertently contacting the canopy glazing material, other material or personnel. Preferably, the enclosure has a partially open end permitting the penetrator to pass through and make contact with the canopy glazing material upon collapse of the enclosure. Alternately, the partially open end may be replaced with a closed end made of easily penetrable materials. The enclosure also has a closed end form fit around one end of the lance and is adapted with a compressible side wall disposed between the partially open end and the closed end such that the compressible side wall compresses upon application of a driving force to the lance.

A foot portion of the lance is adapted to receive an applied force and a penetrator portion of the lance extends from the foot section toward the frangible material in which a crack is to be propagated, such that the canopy or other frangible material is fractured when an applied force is imparted on the foot section of the lance and the penetrator portion of the lance contacts the frangible material. In an alternate embodiment, the closed form fit end of the enclosure may be replaced by an open end which is wrapped around the foot portion thereby conforming to the shape of the foot portion. Although the invention was conceived in the context of breaking aircraft canopies for emergency escape, the device may also be used to initiate crack propagation in almost any frangible material.

Generally in accordance with the present invention, crack propagation in aircraft canopy glazing material is accomplished by prepositioning a penetrating means at a fixed distance from the aircraft canopy glazing material, shielding the penetrating means from inadvertently contacting the aircraft canopy glazing material, other material or personnel, and forcing the penetrating means to contact the aircraft canopy glazing material causing crack propagation in the aircraft canopy glazing material. Preferably, prepositioning the penetrating means is accomplished by mounting the penetrating means on the aircraft canopy glazing material.

In view of the foregoing, it is an object of the present invention to provide a canopy breaker device that will facilitate more streamlined effective ejections of aircrew members from an aircraft. Another object of the present invention is to afford greater commonality among ejection seats installed in different aircraft, i.e., require less concern for run length or for ensuring minimal area contacts with the canopy. Yet another object of the present invention is to reduce the magnitude of problems for effecting safe through-the-canopy ejection created by canopy glazing material heating, whether environmentally induced or induced through aerodynamic heating or any combination thereof.

An advantage of the present invention is that it provides for a canopy breaker device that allows safe usage of very sharp-edged "knife-like" pointed ends. Another advantage of the present invention is that it provides a means for effectively penetrating an aircraft canopy while minimizing the risk of injury to ejectees. Yet another advantage of the present invention is that it allows for looser tolerance and, therefore, less expensive, formed canopy glazing material. That is, greater variation in canopy glazing material thickness and mold lines could be tolerated, resulting in fewer canopy rejections. Still another advantage of the present invention is that it provides a canopy breaking device that is mounted directly upon the canopy glazing material in the area to be penetrated by the ejection seat rather than, as in the current practice, of mounting the penetrators on the seat headrest or providing a separate telescoping guiderail system for the penetrators. A further advantage of the present invention is that it allows relatively low energy penetration of canopy glazing materials. This is accomplished by the use of "knife like" pointed ends. Another advantage of the present invention is that it eliminates the necessity of explosive devices which are themselves inherently dangerous.

A feature of the present invention is that it has a surrounding shield and prepositioner so as to prevent the canopy breaker device from becoming a hazard to personnel or to the canopy glazing material. Another feature of the present invention is that the surrounding protective shield also serves to mount the canopy breaker device directly onto the canopy glazing material at a preset distance therefrom and will thereafter serve to guide the penetrating device through the canopy glazing material upon ejection of the ejection seat and its occupant.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
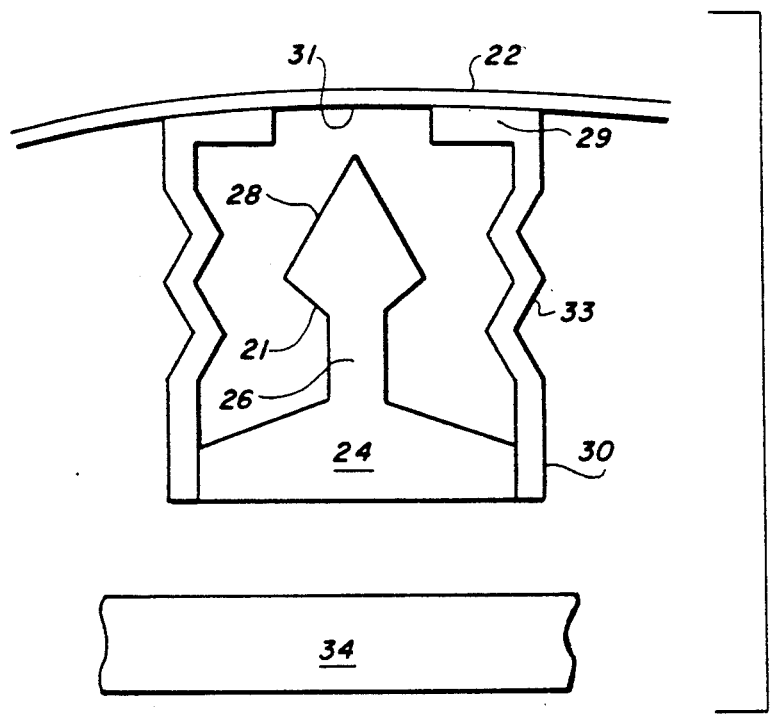
FIG. 1 shows a cutaway view of a canopy breaker device affixed to an aircraft canopy.

Referring now to the drawings, wherein like reference numerals designate identical or corresponding parts throughout the several views, and more particularly to FIG. 1 thereof, which shows a cutaway view of canopy breaker device 20 affixed to an aircraft canopy 22. In canopy breaker 20, lance 21 is positioned adjacent to canopy 22 by collapsible protective shield 30. Lance 21 includes foot section 24 which is tailored for contacting a specific section of a rising ejection seat, for example, ejection seat headrest or headbox 34. Extending upward from foot section 24 is neck portion 26 which integrally connects foot section 24 and penetrator 28. Penetrator 28 preferably has "knife like" sharpness. Lance 21 may be of any of numerous geometric configurations provided penetrator 28 is sufficiently sharp so as not to absorb a high amount of the energy stored in the rising ejection seat.

Enclosing means such as collapsible protective shield 30 surrounds lance 21 and is attached at foot 24 of lance 21 by suitable means such as adhesively bonding. Collapsible protective shield 30 has slot 31 for allowing penetrator 28 of lance 21 to travel through and contact canopy 22. In use, collapsible protective shield 30 is adhesively mounted to canopy 22 via land area 29 so that lance 21 is aligned with the ejection travel path of the top of the aircrew ejection seat thereby allowing for direct transmission of the energy stored in the rising ejection seat to lance 21 of canopy breaker 20 upon ejection. Commercially available bonding agents are used to affix protective shield 30 to both lance 21 and to canopy 22. Collapsible protective shield 30 preferably does not collapse at relatively low energy impacts; for example, the shield preferably will not collapse during installation permitting penetrator 28 to damage canopy 22 or cause injury to personnel. Alternatively, a safety locking pin or the like could be installed inhibiting collapsible protective shield 30 from collapsing. The pin could be "red tagged" so that maintenance personnel would remove the safety lock pin during flight preparations. Collapsible protective shield 30 is made of any suitable material such as for example metal, preferably aluminum, or plastic or other materials having similar characteristics. Material for collapsible protective shield 30 is chosen to withstand environmental extremes such as direct ultra-violet radiation from the sun or temperature extremes of both hot and cold experienced during operation. Collapsible protective shield 30 may be any of numerous different constructions lending themselves to collapse readily upon high energy impact such as that of a rising ejection seat, for example, a bellows type construction similar to the one shown in FIGS. 1 and 2 with bellows-like sidewall 33 or a telescoping construction as shown in FIG. 4 with telescoping sidewall 36.

Figure 2:
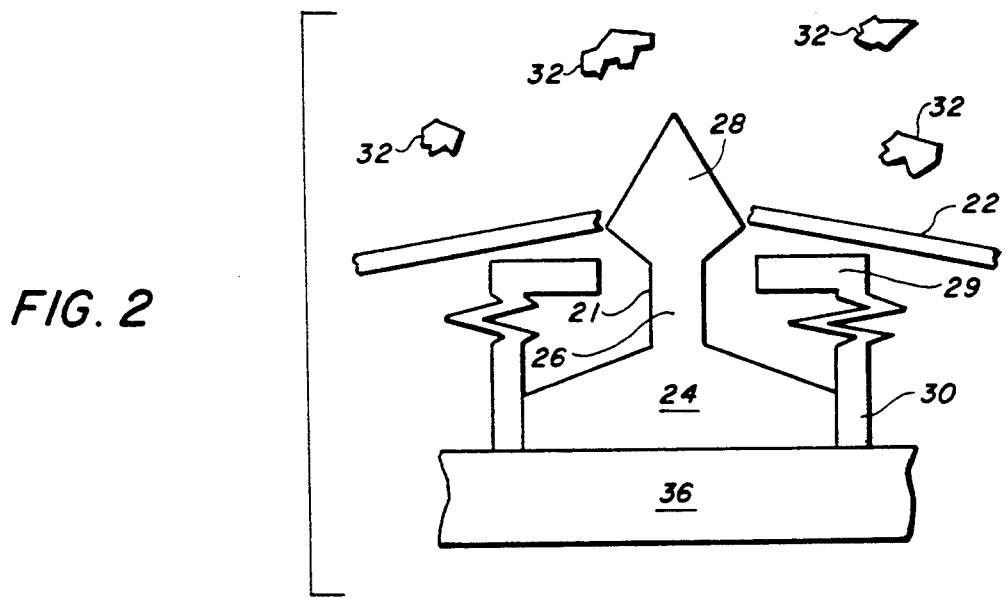
FIG. 2 shows a cutaway view of a canopy breaker device in operation as it penetrates an aircraft canopy.

Referring now to FIG. 2, wherein a cutaway view of a canopy breaker device 20 is shown in operation as it penetrates aircraft canopy 22. In operation, headbox 34 of an ejecting aircrew seat forcibly contacts foot section 24 of lance 21. The force drives lance 21 upward toward canopy 22. Protective shield 30 collapses as shown in FIG. 2 and penetrator 28 of lance 21 is driven through canopy 22. As lance 21 is driven through canopy 22 crack propagation is initiated in canopy 22 so that rising ejecting aircrew seat shatters canopy 22 into fragments 32 with a greatly reduced impact energy absorption thereby preventing many of the commonly experienced ejection-related injuries such as those affecting the ejectee's spine.

Figure 3:
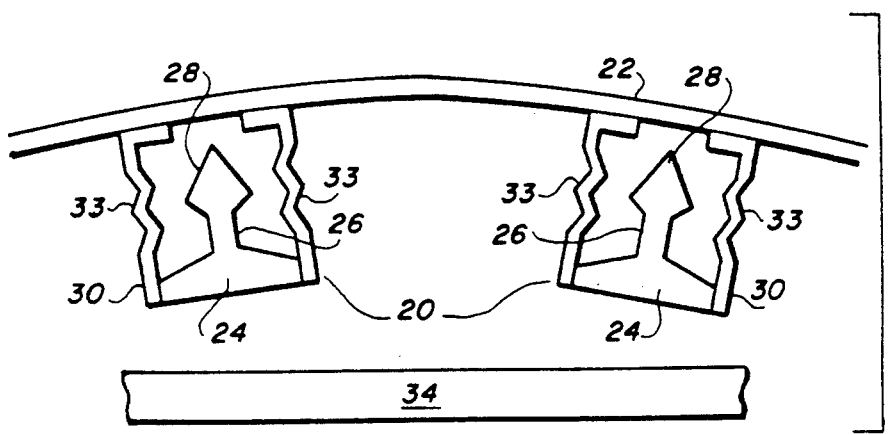
FIG. 3 shows a cutaway view of a pair of canopy breaker devices installed in an aircraft.

Referring now to FIG. 3, wherein a cutaway view of the preferred embodiment of the present invention, a pair of canopy breaker devices 20 as installed on canopy 22 of an aircraft, is shown. Each of canopy breakers 20 is affixed to canopy 22 in alignment with the ejection travel path of headbox 34 of an aircrew ejection seat. Upon ejection, headbox 34 makes contact with foot sections 24 of canopy breakers 20. Upon initial contact, headbox 34 and foot sections 24 become aligned with each other. Lance 21 then continues upward toward canopy 22 driven by rising headbox 34. Upon contact with canopy 22 lance 21 is then driven through canopy 22 and initiates crack propagation in canopy 22. Canopy 22 is next shattered by the rising ejection seat headrest 34 and remainder of the ejection seat.

Figure 4:
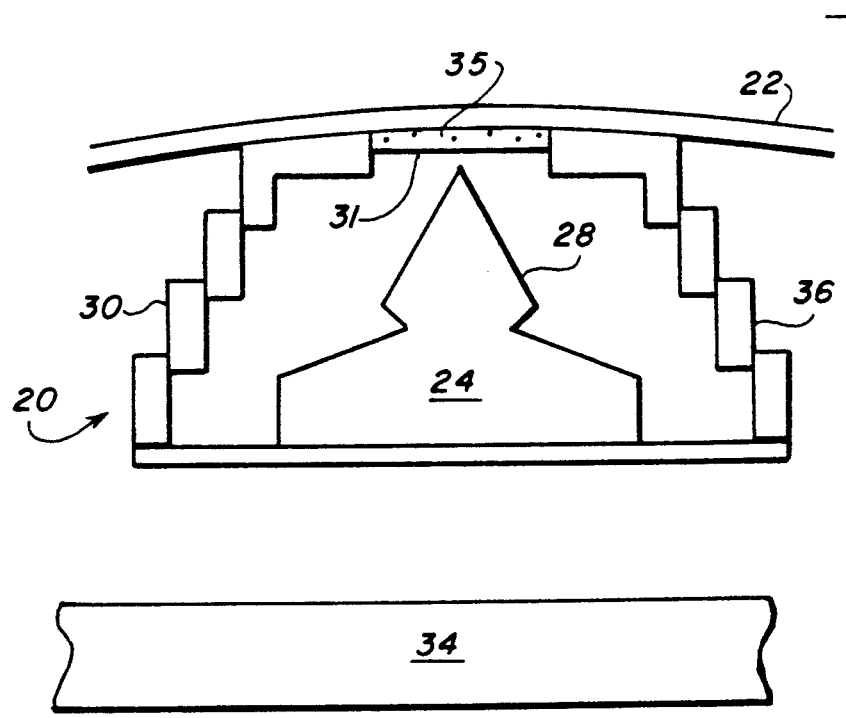
FIG. 4 shows a cutaway view of an alternative construction of collapsible protective sides for a canopy breaker device.

FIG. 4 illustrates another configuration for canopy breaker 20. In the embodiment shown in FIG. 4, collapsible protective shield 30 employs telescoping sidewall 36. Instead of slot 31, collapsible protective shield 30 may have thin end wall 35 or an end wall of material such as thin metal or plastic which is easily penetrated by penetrator 28 so as to allow penetrator 28 to travel through and make contact with canopy 22. Still other constructions may be used in place of slot 31 provided they allow penetrator 28 of canopy breaker 20 to initiate crack propagation in canopy 22 such that minimal resistance is met by the rising ejection seat and thus causes virtually no energy loss.

Figure 5:
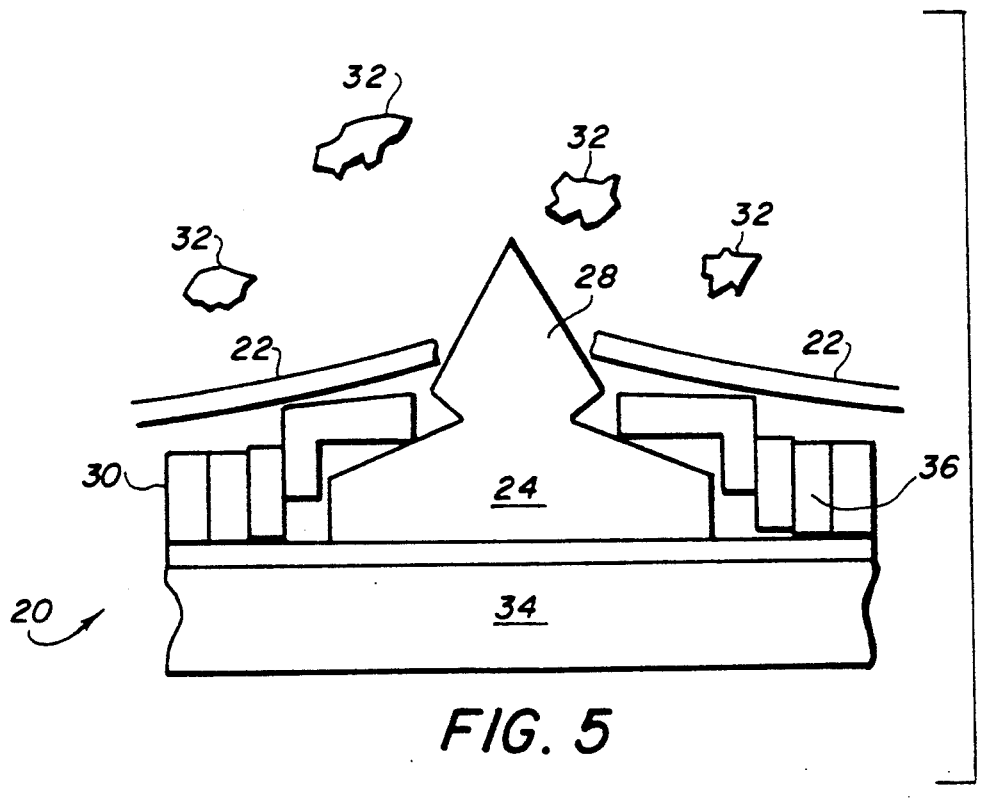
FIG. 5 shows the cutaway view of the canopy breaker device of FIG. 4 after penetrating an aircraft canopy.

Referring now to FIG. 5 wherein a cutaway view of the canopy breaker device of FIG. 4 is shown after penetration of the aircraft canopy. In operation, foot section 24 is contacted by ejection seat headbox 34 in a similar manner as shown in FIG. 3. The energy of the rising ejection seat is transferred through headbox 34 to canopy breaker 20 causing telescoping sidewall 36 to collapse and penetrator 28 to contact canopy 22 thereby initiating crack propagation in canopy 22.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A device for initiating crack propagation in frangible material, comprising:
   means for penetrating said frangible material upon application of a force to said penetrating means;
   means for prepositioning said penetrating means adjacent to said frangible material, adapted for attachment to said frangible materials, wherein said prepositioning means encloses said penetrating means and collapses in an accordion-like manner when a force is applied to said penetrating means.

2. A device for initiating crack propagation in frangible materials, comprising:
   means for penetrating said frangible material upon application of a force to said means for penetrating;
   means for prepositioning said penetrating means adjacent to said frangible material, adapted for attachment to said frangible materials, comprising a partially open end portion permitting said penetrating means to pass therethrough and make contact with said frangible material upon compression of said prepositioning means whereby said penetrating means is enclosed by said enclosing means prior to compression of said prepositioning means, a closed end portion form fit around said penetrating means and a compressible side wall disposed between said partially open end portion and said closed end portion such that said compressible side wall compresses upon application of a driving force to said penetrating means.

3. A device for initiating crack propagation in frangible materials, comprising:
   means for penetrating said frangible material upon application of a force to said means for penetrating;
   means for prepositioning said penetrating means adjacent to said frangible material, adapted for attachment to said frangible materials, enclosing said penetrating means prior to compression of said prepositioning means, comprising a partially open first end portion adapted to permit said penetrating means to pass therethrough and contact said frangible material upon compression of said prepositioning means, a second end portion including an opening, and a compressible side wall fixedly attached to and disposed between said partially open first end portion and said second end portion such that said compressible side wall compresses upon application of a driving force to said penetrating means.

4. A device for initiating crack propagation in frangible materials, comprising:
   means for penetrating said frangible material upon application of a force to said penetrating means, comprising a foot section adapted to receive an applied force and a penetrator extending upward from said foot section for initially contacting said frangible material such that when said applied force is imparted on said foot section said penetrator initiates crack propagation in said frangible material;
   means for prepositioning said penetrating means adjacent to said frangible material, adapted for attachment to said frangible materials, comprising a partially open end portion permitting said penetrating means to pass therethrough and make contact with said frangible material upon compression of said prepositioning means whereby said penetrating means is enclosed by said prepositioning means prior to compression of said prepositioning means, a second end portion having an opening, said second end portion being form fit around said foot section of said device, and a compressible side wall disposed between said partially open end portion and said second end portion such that said compressible side wall compresses upon application of a driving force to said foot section.

5. A device for initiating crack propagation in frangible materials, comprising:
   means for penetrating said frangible material upon application of a force to said penetrating means, comprising a foot section adapted to receive an applied force and a penetrator extending upward from said foot section for initially contacting said frangible material such that when an applied force is imparted on said foot section said penetrator initiates crack propagation in said frangible material;
   means for prepositioning said penetrating means adjacent to said frangible material, adapted for attachment to said frangible materials, comprising a partially open end portion permitting said penetrating means to pass therethrough and make contact with said frangible material upon compression of said prepositioning means whereby said penetrating means is enclosed by said prepositioning means prior to compression of said prepositioning means, a second end portion having an opening, said second end portion being form fit around said foot section, and a compressible side wall fixedly attached to and disposed between said partially open end portion and said second end portion such that said compressible side wall compresses upon application of a driving force to said foot section.

6. A device for initiating crack propagation in frangible materials, comprising:
   means for penetrating said frangible material upon application of a force to said penetrating means;
   means for prepositioning said penetrating means adjacent to said frangible material, adapted for attachment to said frangible materials, enclosing said penetrating means prior to compression of said prepositioning means, comprising a first closed end made with penetrable materials adapted to permit said penetrating means to pass therethrough and contact said frangible material upon compression of said prepositioning means, a second end and a compressible side wall fixedly attached to and disposed between said partially open first end and said second end wherein said compressible side wall compresses upon application of a force to said penetrating means.

7. A device for initiating crack propagation in frangible materials, comprising:
   means for penetrating said frangible material upon application of a force to said means for penetrating, comprising a foot section adapted to receive an applied force and a penetrator extending upward from said foot section for initially contacting said frangible material such that when said applied force is imparted on said foot section said penetrator initiates crack propagation in said frangible material;
   means for prepositioning said penetrating means adjacent to said frangible material, adapted for attachment to said frangible materials, enclosing said penetrating means prior to compression of said prepositioning means, comprising a first closed end made of penetrable material permitting said penetrating means to pass therethrough and make contact with said frangible material upon compression of said prepositioning means, a second end being fixedly attached to said foot section, and a compressible side wall disposed between said first closed end and said second end such that said compressible side wall compresses upon application of a force to said foot section.

* * * * *